United States Patent [19]

Danner

[11] Patent Number: 4,784,194

[45] Date of Patent: Nov. 15, 1988

[54] INSERTED SUPPORTING MEANS FOR WORKTABLES

[75] Inventor: Stefan Danner, Reutlingen-Mittelstadt, Fed. Rep. of Germany

[73] Assignee: Trumpf GmbH & Co., Ditzingen, Fed. Rep. of Germany

[21] Appl. No.: 116,449

[22] Filed: Nov. 3, 1987

[30] Foreign Application Priority Data

Nov. 4, 1986 [DE] Fed. Rep. of Germany ....... 3637559

[51] Int. Cl.[4] ......................... B25N 1/00; B65G 13/00

[52] U.S. Cl. ............................... 144/286 R; 108/55.3; 193/35 MD

[58] Field of Search ....................... 144/286 R, 286 A; 269/289 R; 108/55.3, 56.1, 57.1, 102, 103; 193/35 MD

[56] References Cited

U.S. PATENT DOCUMENTS

| | | | |
|---|---|---|---|
| 2,931,477 | 4/1960 | Metzgar | 193/35 MD |
| 3,020,993 | 2/1962 | Heinrich | 193/35 MD |
| 3,739,894 | 6/1973 | Hinman | 193/35 MD |
| 4,347,794 | 9/1982 | Nordström | 193/35 MD |

FOREIGN PATENT DOCUMENTS

| | | | |
|---|---|---|---|
| 11407 | 1/1980 | Japan | 193/35 MD |

*Primary Examiner*—W. Donald Bray

[57] ABSTRACT

A worktable providing rolling support for workpieces thereon has a multiplicity of spaced, generally circular passages extending therethrough with at least one outwardly extending channel. Removably seated in the passages are ball insert units rotatably supporting a ball therewithin and having a locking element projecting laterally outwardly therefrom adjacent the lower end and resiliently bearing against a surface of the table member to secure the ball insert unit in firm assembly therewith. The projecting locking element may be rotated into alignment with the channel of the passage to effect release of the ball insert unit from the table member, and for movement upwardly and downwardly in the passage. The biasing action can be effected by resilient deflectability of the portion of the table member against which the locking element bears, by use of separate spring elements, by forming the locking element from a resiliently deflectable material, and by use of other components which will provide the resilient deflectability to permit rotation of the locking element into a locking position or into alignment with the vertical channel of the passage.

19 Claims, 3 Drawing Sheets

INSERTED SUPPORTING MEANS FOR WORKTABLES

BACKGROUND OF THE INVENTION

The present invention relates to worktables of the type providing rolling elements to support the workpiece for movement therealong and more particularly to novel ball insert units therefor.

In order to minimize the resistance to movement of a workpiece across the surface of a worktable, rotatable ball elements or the like have been provided in the surface of the worktable to support the work thereon. Generally, these rotatable elements comprise ball casters which are positioned in insert units which in turn are set into recesses formed in the supporting worktable surface. The insert units usually have a head which is supported on the surface of the top plate or table and a shaft which extends through the top plate or table and outwardly of the lower surface thereof. Generally, the outwardly extending shaft has a screw thread, and a nut or other fastening element is screwed onto the threaded shaft and tightened against the bottom surface of the table. In some instances, the fastening element is a safety ring, a set screw, or the like. However all of these generally require that, the mechanic have access to the bottom surface of the table or plate to effect the necessary engagement.

Use of separate fastening elements to retain the unit in the table increases the cost because of the fabrication requirements and difficulties in effecting assembly. Moreover, when the fastening elements must be assembled to a portion of the unit projecting downwardly from the lower surface of the table, it is possible for the elements to become misplaced or lost at the time of assembly and disassembly.

Accordingly, it is an object of the present invention to provide a novel ball insert unit for worktables which is relatively simple in structure and which can be rapidly and easily inserted and securely fastened into the worktable surface from thereabove.

It is also an object to provide such a ball insert unit which is relatively economical to fabricate and which provides a relatively long lived unitary assembly.

Another object is to provide such a ball insert unit wherein resilient biasing forces are applied between the ball insert and the worktable to maintain the ball insert units securely positioned within the table against inadvertent disassembly.

SUMMARY OF THE INVENTION

It has now been found that the foregoing and related object may be readily attained in a worktable which includes a generally horizontal table member having upper and lower surfaces and a plurality of passages spaced thereabout and extending vertically therethrough. These passages having a generally circular cross section with at least one laterally extending channel extending outwardly from the circumference thereof. Removably seated in the passages are ball insert units which include a housing member of generally circular cross section with an upwardly opening recess and a peripheral portion adjacent the upper end thereof engaged with the table member to limit movement downwardly in the passage. A ball element is seated in the recess and projects above the plane of the upper surface of the table member to support a workpiece thereon. An engagement element adjacent the lower end of the housing member has at least one lock portion projecting laterally outwardly from the circular periphery of the passage and is engaged with a cooperating surface of the table member to prevent movement of the ball insert unit upwardly in the passage. The ball insert unit is rotatable in the passage to align the projecting lock portion with the channel to permit insertion and removal of the ball insert unit from the passage.

In its preferred form, the ball insert unit has engageable means at its upper end for engagement by a tool to effect rotation of the ball insert unit and application of forces thereto to effect locking and release from the table member.

The table member has a recess in its upper surface adjacent each of the passages, and each of the housing members has a laterally projecting portion at its upper end seated in the recess. Desirably, the passages have a pair of diametrically opposed channels and the housing members have a pair of diametrically opposed lock portions.

In one form, the lock portions are provided by a continuous rod element extending through the body of housing member adjacent its lower end, and this rod conveniently is of generally circular cross section.

The surface of the table member against which the lock portion abuts includes at least one recess angularly offset from the channel and of lesser width than the lock portion to seat the lock portion therein.

Preferably, the lock portions are engaged with the lower surface of the table member, and the lock portion and table member cooperating surface are resiliently biased together to provide resistance to rotation of the ball insert unit within said passage. Conveniently, the ball insert includes resiliently deflectable means biasing the projecting lock portion against the cooperating surface. Alternatively, the projecting lock portion may be provided by a resiliently deflectable member or by a resiliently compressible member.

DETAILED DESCRIPTION OF THE ILLUSTRATED EMBODIMENTS

Figure 1:
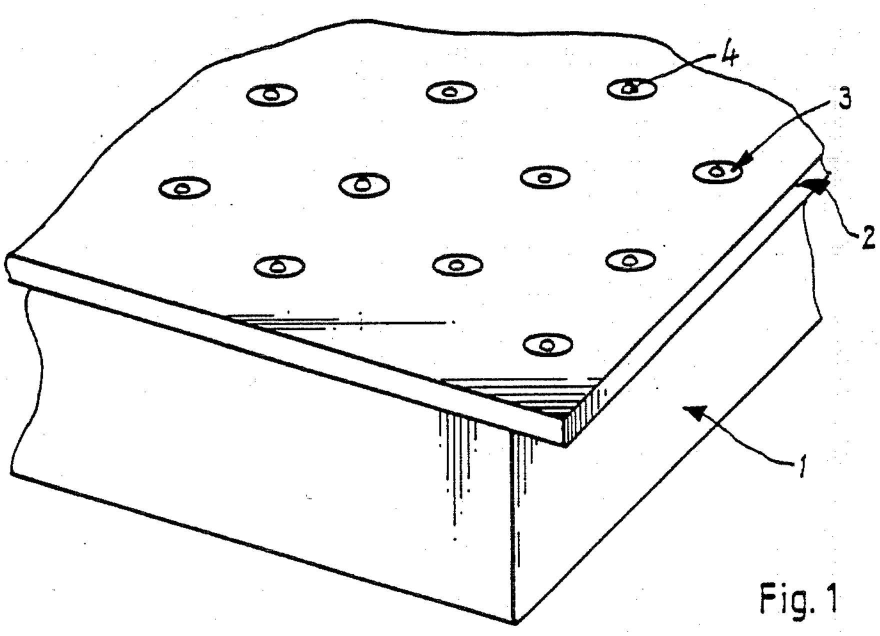
FIG. 1 is a fragmentary perspective view of a worktable embodying the present invention.

Turning first to FIG. 1 of the attached drawings, therein illustrated fragmentarily is a worktable assembly embodying the present invention, wherein the worktable is generally designated by the numeral 1, and the horizontal table member is generally designated by the numeral 2. Spaced about the surface of the table member 2 are a multiplicity of ball insert units generally designated by the numeral 3, and which have roller balls 4 projecting outwardly therefrom and upon which a workpiece (not shown) is seated for purposes of movement about the worktable 1.

Figure 2:
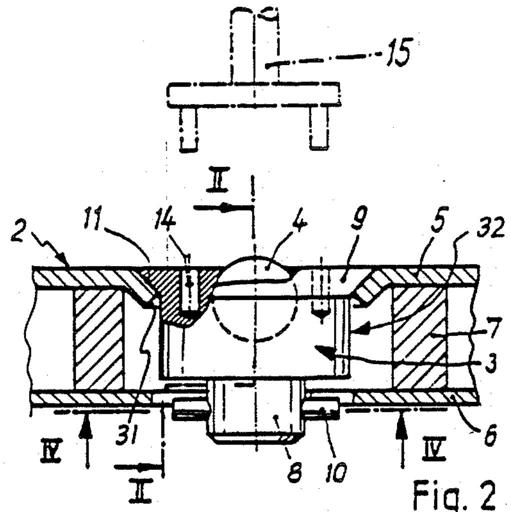
FIG. 2 is a fragmentary sectional view through a ball insert unit of the worktable of FIG. 1 showing the ball insert unit in its locked position and showing in phantom line a tensioning tool utilized in connection therewith.
Figure 3:
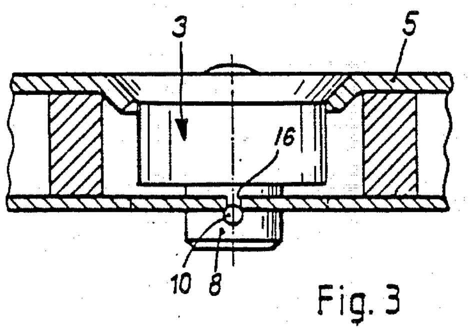
FIG. 3 is a sectional view along the line III—III of FIG. 2.
Figure 4:
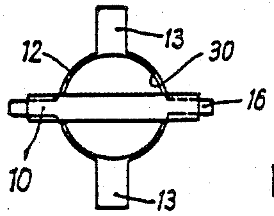
FIG. 4 is a bottom view of the ball insert unit along the plant IV—IV of FIG. 2.

Turning now to FIGS. 2-4, therein illustrated is an embodiment of the present invention wherein the table member 2 is comprised of an upper plate 5 and a lower plate 6 with spacers 7 therebetween. Extending through the table member 2 are vertical passages generally designated by the numeral 30 which are of generally circular cross section. The diameter of the aperture 31 in the upper plate 5 is greater than the diameter of the aperture 12 in the lower plate 6, and the passage 30 through the bottom plate 6 has a pair of diametrically spaced channels 13, and a second pair of diametrically opposed slots of lesser width 16 extending along an axis perpendicular to that of the channels 13 as best seen in FIG. 4. The upper plate 5 is deformed downwardly about the passage therethrough to provide an inclined shoulder 11 thereabout as seen in FIG. 2.

The ball insert unit 3 includes a housing member generally designated by the numeral 32 with an outwardly flaring upper end portion 9 providing a flange which seats upon the downwardly sloping shoulder 11 in the upper plate 5. The housing member 32 provides an upwardly opening recess in which is rotatably captured the ball 4, and a pair of tool receiving recesses 14 are provided in the upper surface thereof. The housing member 32 also includes a downwardly extending portion 8 of smaller diameter which extends through the aperture 12 in the lower plate 6.

Extending diagonally outwardly from the reduced diameter portion 8 are a pair of coupling or lock elements 10 which are shown seated in the slots 16, thus, locking the ball insert units 3 in assembly with the table member 2.

In this embodiment, the ball insert unit 3 is oriented so that the locking elements 10 are aligned with the channels 13 and then inserted into the passages 30. After the flange 9 seats against the shoulder 11, the tool 15 is inserted into the recesses 14 and rotation is effected. The rounded surfaces of the locking elements cam outwardly of the channels 13 and deflect the plate 6 upwardly. Rotation is continued until the locking elements 10 seat in the slots 16 as in the FIGS. 2-4, thus providing substantial biasing pressure between locking elements 10 and the cooperating surface of the plate 6 to retain the units 3 in assembly with the table 2.

Figure 5:
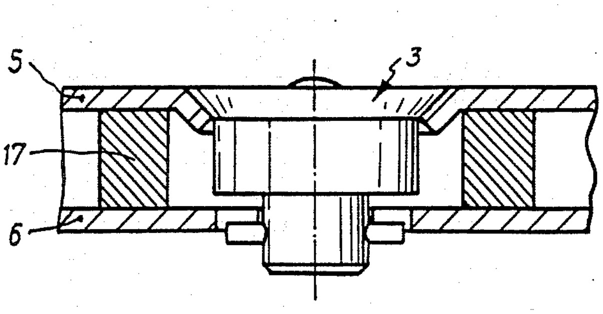
FIG. 5 is a sectional view of another embodiment of a worktable utilizing the present invention.

In the embodiment of FIG. 5, the table member 2 is fabricated from plates 5 and 6 of uniform thickness and the resilient deflectability of the bottom plate 6 is permitted by the use of resiliently compressible spacers 17.

Figure 6:
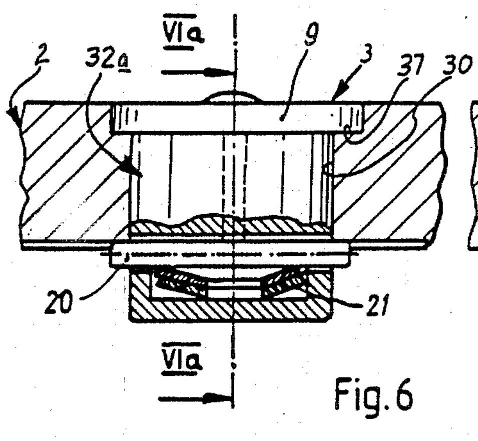
FIG. 6 is a fragmentary sectional view of another embodiment of a worktable and ball insert unit with a portion of the ball insert unit broken away to reveal internal construction.
Figure 6A:
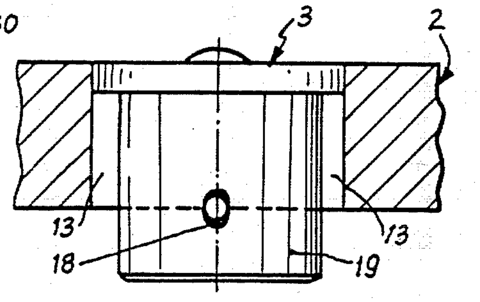
FIG. 6*a* is an elevational view of the assembly of FIG. 6 looking in the direction of the line VIa—VIa of FIG. 6.

Turning now to the embodiment of FIGS. 6 and 6*a*, the table member 2 is of solid construction and it has a passage 30 of generally circular cross section extending therethrough with a pair of diametrically opposed channels 13. The upper surface of the table member 2 has a circular recess 37 extending about the passage 30 to provide a shoulder upon which is seated the peripheral flange 9 at the upper end of the housing member 32*a*.

Seated in a chamber at the lower end of the housing member 32*a* are a pair of cup-shaped spring washers 21 which bear against the lower surface of a rod 20 which extends diametrically outwardly of the housing member 32*a* through vertically elongated openings 18. In this embodiment, the ball insert unit 3 is aligned with the rod 20 registering with the channels 13 and is pressed downwardly in the passage 30 until the rod 20 is at the lower surface of the table member 2. Rotation then cams the rod 20 downwardly against the biasing pressure of the springs 21, and the projecting portions of the rod 20 resiliently bear against the lower surface of the table member 2 to provide the resiliently biasing locking force to retain the ball insert unit 3 in assembly within the table member 2.

Figure 7:
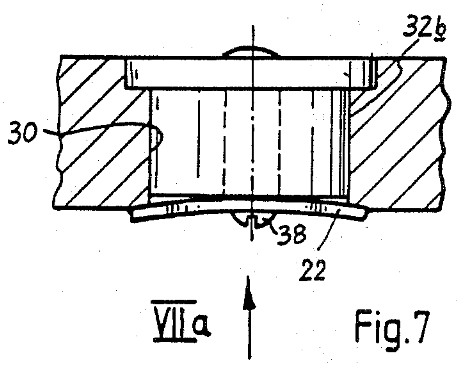
FIG. 7 is a sectional view of another embodiment of a worktable and ball insert unit.
Figure 7A:
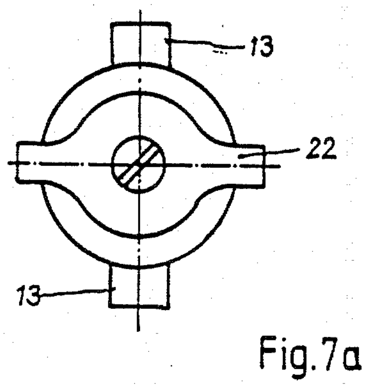
FIG. 7*a* is a bottom view of the ball insert unit of FIG. 7 looking in the direction of the arrow VIIa.

Turning now to the embodiment of FIGS. 7 and 7*a*, at the lower end of the housing member 32*b* is a leaf spring 22 with diametrically projecting locking elements dimensioned to extend beyond the periphery of the circular passage 30, and it is secured to the housing member 32*b* by a threaded fastener 38. To assemble or disassemble the ball insert unit 3 from the table member 2, the projecting portions of the leaf spring 22 are aligned with the channels 13. After movement downwardly, locking is effected by camming the projecting portions of the leaf spring 22 downwardly to rotate them outwardly of the channel 13 so that they will bear against the lower surface of the table member 2 as seen in FIG. 7. To facilitate such action, the lower surface of the table member 2 is desirably chamferred outwardly from the channels 13.

Figure 8:
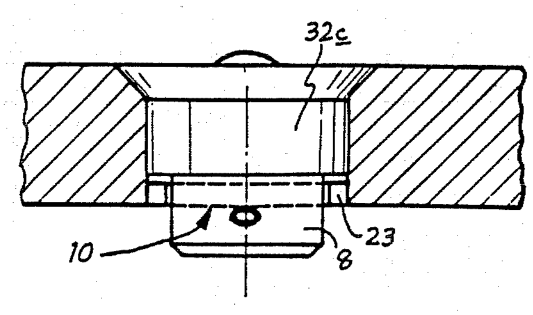
FIG. 8 is a similar fragmentary sectional view of the worktable assembly showing still another embodiment of a ball insert unit.

Turning now to the embodiment of FIG. 8, the housing member 32*c* has a reduced diameter lower end portion 8 which extends through a generally annular insert sleeve 23 at the bottom of the passage 30, and this sleeve 23 is formed of resiliently compressible material. Thus, the locking member 10 may be rotated to bear outwardly of the channel 13 (not shown) against the lower surface of the insert sleeve, and it will provide the biasing pressure in combination therewith to retain the ball insert unit 3 in assembly within the table member 2.

Figure 9:
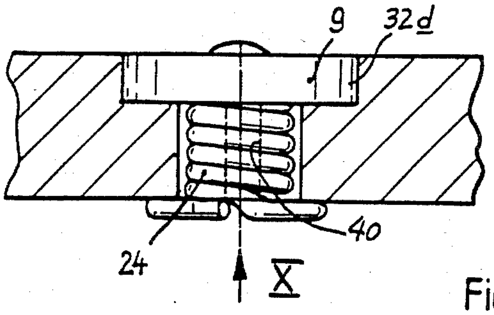
FIG. 9 is a fragmentary sectional view of another embodiment of a worktable assembly showing still yet another form of ball insert unit.
Figure 10:
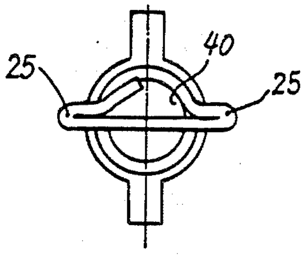
FIG. 10 is a bottom view of the ball insert unit of FIG. 9 in the direction shown by the arrow X in FIG. 9.

Turning now to the embodiment of FIGS. 9 and 10, the housing member 32*d* includes a relatively large diameter upper end portion providing the flange 9 seated in the table member 2 and retaining the ball 4. A relatively small diameter shaft portion 40 extends downwardly therefrom and about which is coiled a spring 24 which, at its lower end, is bent to provide outwardly projecting diametrically opposed locking elements 25 to resiliently bear against the lower surface of the table member 2.

Figure 11:
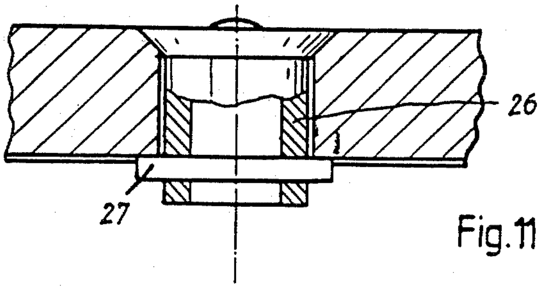
FIG. 11 is a fragmentary sectional view of a worktable assembly showing still another embodiment of ball insert unit which is in fragmentary section to reveal internal construction.

In the embodiment of FIG. 11, the housing member 26 is fabricated from a synthetic resin material which is resiliently expansible, and the locking rod 27 extends diametrically therethrough. When the locking rod 27 is cammed outwardly of the channel 13 (not shown in this Figure) it will produce elongation of the housing member 26 to produce the resilient biasing pressure holding the ball insert unit 3 within the table member 2.

Figure 12:
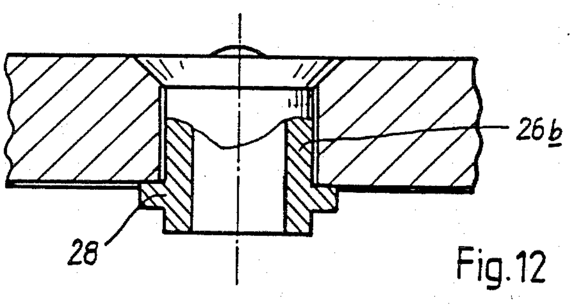
FIG. 12 is a similar view of a variation of the embodiment of ball insert unit seen in FIG. 11.

Turning last to the embodiment of FIG. 12, the housing member 26b is integrally formed with a pair of diametrically spaced locking projections 28 which, when rotated outwardly of the channel 13, will provide the resilient bearing pressure against the lower surface of the table member 2.

In each of the several embodiments illustrated and described above, it can be seen that the locking member is rotated into a position where it abuts against a downwardly facing surface on the table member, and there is produced resilient biasing pressure between the locking member and the table member against which it bears to ensure firm retention of the ball insert unit within the table member. By providing this means of engagement in the form of a projection which may be locked against a lower surface of the table member, and moved inwardly and outwardly through a channel extending outwardly of the circular passage through the table member, assembly and disassembly may be effected rapidly from the top surface of the table member. Moreover, the insert ball units comprise a unitary assembly at all times during assembly and disassembly, thus avoiding the need for excessive manipulation of parts and the possibility of losing parts.

Although it has not been specifically illustrated, it will be appreciated that the housing member of the ball insert units will normally comprise at least two pieces which may be assembled upon placement of the ball within a recess therein, so that it is captured within the recess due to a relatively small diameter aperture in the upper surface of the housing member.

Although a spanner-type wrench has been shown as the tool for effecting the rotation and applying the pressure necessary to effect the camming action, other types of tools may also be employed. Moreover, it will be readily appreciated that the lower surface about the channels is desirable chamferred to facilitate the camming action of the locking elements from the passages.

Thus, it can be seen from the foregoing detailed description and the attached drawings that the worktable of the present invention permits facile assembly and removal of the ball insert units from the worktable at the top surface. It is no longer necessary for the mechanic to have access to the lower surface of the table, or to utilize separate fasteners to secure the ball insert units within the table. Assembly and disassembly may be readily effected by use of simple tools and in a convenient manner.

Having thus described the invention, what is claimed is:

1. In a worktable providing rolling support for a workpiece placed thereon, the combination comprising:

(a) a generally horizontal table member having upper and lower surfaces and a plurality of passages spaced thereabout and extending vertically therethrough, said passages having a generally circular cross section with at least one laterally extending channel extending outwardly from the circumference thereof; and (b) ball insert units removably seated in said passages, each of said ball insert units including a housing member of generally circular cross section with an upwardly opening recess and a peripheral portion adjacent the upper end thereof engaged with said table member to limit movement downwardly in said passage, a ball element seated in said recess and projecting above the plane of said upper surface of said table member to support a workpiece thereon, and an engagement element adjacent the lower end of said housing member having at least one lock portion projecting laterally outwardly from the circular periphery of said passage and engaged with a cooperating surface of said table member to prevent movement of said ball insert unit upwardly in said passage, said ball insert unit being rotatable in said passage to align said projecting lock portion with said channel to permit insertion and removal of said ball insert unit from said passage, at least one of said ball insert unit and table member having means thereon to resiliently bias said unit and member together to provide resistance to rotation of said ball insert unit within said table member, said ball insert unit having means adjacent its upper end for manipulation to effect rotation of said ball insert unit in said passage and overcome the forces biasing said members together to resist rotation and to effect locking and release of said ball insert member.

2. In a worktable providing rolling support for a workpiece placed thereon, the combination comprising:

(a) a generally horizontal table member having upper and lower surfaces and a plurality of passages spaced thereabout and extending vertically therethrough, said passages having a generally circular cross section with at least one laterally extending channel extending outwardly from the circumference thereof; and (b) ball insert units removably seated in said passages, each of said ball insert units including a housing member of generally circular cross section with an upwardly opening recess and a peripheral portion adjacent the upper end thereof engaged with said table member to limit movement downwardly in said passage, a ball element seated in said recess and projecting above the plane of said upper surface of said table member to support a workpiece thereon, and an engagement element adjacent the lower end of said housing member having at least one lock portion projecting laterally outwardly from the circular periphery of said passage and is engaged with a cooperating surface of said table member to prevent movement of said ball insert unit upwardly in said passage, said ball insert unit being rotatable in said passage to align said projecting lock portion with said channel to permit insertion and removal of said ball insert unit from said passage, said ball insert unit having engageable means at its upper end for engagement by a tool to effect rotation of said ball insert unit and application of forces thereto to effect locking and release from said table member.

3. The worktable combination in accordance with claim 1 wherein said table member has a recess in its upper surface adjacent each of said passages and each of said housing members has a laterally projecting portion at its upper end seated in said recess.

4. In a worktable providing rolling support for a workpiece placed thereon, the combination comprising:

(a) a generally horizontal table member having upper and lower surfaces and a plurality of passages spaced thereabout and extending vertically therethrough, said passages having a generally circular cross section with at least one laterally extending channel extending outwardly from the circumference thereof; and (b) ball insert units removably seated in said passages, each of said ball insert units including a housing member of generally circular cross section with an upwardly opening recess and a peripheral portion adjacent the upper end thereof engaged with said table member to limit movement downwardly in said passage, a ball element seated in said recess and projecting above the plane of said upper surface of said table member to support a workpiece thereon, and an engagement element adjacent the lower end of said housing member having at least one lock portion projecting laterally outwardly from the circular periphery of said passage and is engaged with a cooperating surface of said table member to prevent movement of said ball insert unit upwardly in said passage, said ball insert unit being rotatable in said passage to align said projecting lock portion with said channel to permit insertion and removal of said ball insert unit from said passage, said passages having a pair of diametrically opposed channels and said housing members having a pair of diametrically opposed lock portions.

5. The worktable combination in accordance with claim 4 wherein said lock portions are provided by a continuous rod element extending through said body of housing member adjacent its lower end.

6. The worktable combination in accordance with claim 5 wherein said rod is of generally circular cross section.

7. In a worktable providing rolling support for a workpiece placed thereon, the combination comprising:

(a) a generally horizontal table member having upper and lower surfaces and a plurality of passages spaced thereabout and extending vertically therethrough, said passages having a generally circular cross section with at least one laterally extending channel extending outwardly from the circumference thereof; and (b) ball insert units removably seated in said passages, each of said ball insert units including a housing member of generally circular cross section with an upwardly opening recess and a peripheral portion adjacent the upper end thereof engaged with said table member to limit movement downwardly in said passage, a ball element seated in said recess and projecting above the plane of said upper surface of said table member to support a workpiece thereon, and an engagement element adjacent the lower end of said housing member having at least one lock portion projecting laterally outwardly from the circular periphery of said passage and is engaged with a cooperating surface of said table member to prevent movement of said ball insert unit upwardly in said passage, said ball insert unit being rotatable in said passage to align said projecting lock portion with said channel to permit insertion and removal of said ball insert unit from said passage, the surface of said table member against which said lock portion abuts including at least one recess angularly offset from said channel and of lesser width than said lock portion to seat said lock portion therein.

8. The worktable combination in accordance with claim 1 wherein said lock portions are engaged with the lower surface of said table member.

9. The worktable combination in accordance with claim 1 wherein said lock portion and table member cooperating surface are resiliently biased together to provide said resilient biasing action and resistance to rotation of said ball insert unit within said passage.

10. The worktable combination in accordance with claim 9 wherein said ball insert includes resiliently deflectable means biasing said projecting lock portion against said cooperating surface.

11. The worktable combination in accordance with claim 9 wherein said projecting lock portion is provided by a resiliently deflectable member.

12. The worktable combination in accordance with claim 9 wherein said lock portion is provided by a resiliently compressible member.

13. The worktable combination in accordance with claim 9 wherein said table member includes a pair of vertically spaced horizontal plates and resiliently compressible spacer elements between said plates.

14. The worktable combination in accordance with claim 9 wherein at least a portion of said housing member is fabricated from a resiliently expansible material.

15. In a worktable providing rolling support for a workpiece placed thereon, the combination comprising:

(a) a generally horizontal table member having upper and lower surfaces and a plurality of passages spaced thereabout and extending vertically therethrough, said passages having a generally circular cross section with at least one laterally extending channel extending outwardly from the circumference thereof; and (b) ball insert units removably seated in said passages, each of said ball insert units including a housing member of generally circular cross section with an upwardly opening recess and a peripheral portion adjacent the upper end thereof engaged with said table member to limit movement downwardly in said passage, a ball element seated in said recess and projecting above the plane of said upper surface of said table member to support a workpiece thereon, and an engagement element adjacent the lower end of said housing member having at least one lock portion projecting laterally outwardly from the circular periphery of said passage and is engaged with a cooperating surface of said table member to prevent movement of said ball insert unit upwardly in said passage, said lock portion and table member cooperating surface being resiliently biased together to provide resistance to rotation of said ball insert unit within said passage, said ball insert unit having engageable means at its upper end for engagement by a tool to effect rotation of said ball insert unit and application of forces thereto to effect locking and release from said table member, said ball insert unit being rotatable in said passage to align said projecting lock portion with said channel to permit insertion and removal of said ball insert unit from said passage.

16. The worktable combination in accordance with claim 15 wherein said table member has a recess in its upper surface adjacent each of said passages and each of said housing members has a laterally projecting portion at its upper end seated in said recess.

17. The worktable combination in accordance with claim 15 wherein said passages have a pair of diametrically opposed channels and said housing members have a pair of diametrically opposed lock portions.

18. The worktable combination in accordance with claim 15 wherein the surface of said table member against which said lock portion abuts includes at least one recess angularly offset from said channel and of lesser width than said lock portion to seat said lock portion therein.

19. The worktable combination in accordance with claim 15 wherein said lock portions are engaged with the lower surface of said table member.

* * * * *